United States Patent [19]

Kliment et al.

[11] 4,009,684
[45] Mar. 1, 1977

[54] WATER SOLUBLE POLYMERS USEFUL IN THE PREPARATION OF NOVEL ANIMAL LITTER

[75] Inventors: Karel Kliment, Princeton; Rudolf N. Vermes, Randolph; Richard F. Stockel, Somerville, all of N.J.

[73] Assignee: National Patent Development Corporation, New York, N.Y.

[22] Filed: Nov. 26, 1975

[21] Appl. No.: 635,522

[52] U.S. Cl. .................................. 119/1; 424/76
[51] Int. Cl.² .................................. A01K 29/00
[58] Field of Search .................. 119/1; 424/76

[56] References Cited

UNITED STATES PATENTS

| | | | |
|---|---|---|---|
| 3,735,734 | 5/1973 | Pierce et al. | 119/1 |
| 3,765,371 | 10/1973 | Fisher | 119/1 |
| 3,828,731 | 8/1974 | White | 119/1 |
| 3,921,581 | 11/1975 | Brewer | 119/1 |

*Primary Examiner*—Hugh R. Chamblee
*Attorney, Agent, or Firm*—Cushman, Darby & Cushman

[57] ABSTRACT

An animal litter is prepared comprising a loose substrate treated with a solid water soluble copolymer of (a) 5 – 35% of a hydroxyester of a 2-alkenoate having the formula

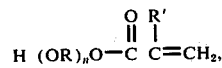

wherein R is alkylene of 2 to 4 carbon atoms and R' is hydrogen or alkyl of 1 to 4 carbon atoms, n is an integer and (b) a copolymerizable water soluble monomer or polymer. The polymer is prepared in solution in a solvent or one of the monomers. A fragrance is also added.

20 Claims, No Drawings

WATER SOLUBLE POLYMERS USEFUL IN THE PREPARATION OF NOVEL ANIMAL LITTER

The present invention relates to a novel animal litter comprising a porous, inert solid substrate (which is preferably loose) treated with (e.g., containing) a water soluble copolymer of (a) 5–35%, preferably 10–30% of a hydroxyester of a 2-alkenoate having the formula

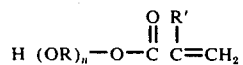

$$\text{H}(\text{OR})_n\text{—O—}\overset{\text{O}}{\overset{\|}{\text{C}}}\,\overset{\text{R}'}{\overset{|}{\text{C}}}=\text{CH}_2$$

wherein R is alkylene of 2 to 4 carbon atoms, preferably 2 to 3 carbon atoms, most preferably 2 carbon atoms, R' is hydrogen or alkyl of 1 to 4 carbon atoms, more preferably hydrogen or methyl, most preferably methyl and n is an integer of at least 1, e.g., 1 to 5, desirably 1 to 3 and preferably 1, with (b) 95–65% preferably 90–70% of a copolymerizable water soluble monomer, e.g. an ethylinically unsaturated monomer, or polymer which can be for example, an ethylenically unsaturated amide, e.g., acrylamide, methacrylamide or an N-lower alkyl or N, N-dilower alkyl alkenamide such as N-methylacrylamide, N,N'-dimethyl acrylamide, N-methyl methacrylamide, N-ethyl acrylamide, an alkenyl pyrrolidone, e.g., 1-vinyl pyrrolidone, an alkenyl pyridine, e.g., 2-vinyl pyridine, 3-vinyl pyridine, 4-vinyl pyridine, 2-methyl-5-vinyl pyridine and other lower alkyl vinyl pyridines, lower vinyl alkyl ethers such as methyl vinyl ether, vinyl sulfonic acid, an ammonium or alkali metal (e.g., sodium or potassium) salt of a polymerizable ethylenically unsaturated (or nonbenzenoid unsaturated) organic acid, or a strong acid salt of a polymerizable ethylenically unsaturated (or nonbenzenoid unsaturated) amino containing monomer.

Examples of organic acids for making the ammonium and alkali metal salts include acrylic acid, methacrylic acid, maleic acid, fumaric acid, itaconic acid, aconitic acid, cinnamic acid, crotonic acid, cyclohexene, carboxylic acid, propiolic acid, mesaconic acid, citraconic acid, vinyl sulfonic acid, p-vinylbenzenesulfonic acid, partial esters such as mono 2-hydroxyethyl citraconate, mono 2-hydroxypropyl itaconate, mono 2-hydroxyethyl itaconate, mono 2-hydroxypropyl citraconate, mono 2-hydroxyethyl maleate, mono 2-hydroxypropyl fumarate, mono methyl itaconate, monoethyl itaconate, mono methyl Cellosolve itaconate (methyl Cellosolve is the monomethyl ether of diethylene glycol), mono methyl Cellosolve maleate, mono-2-hydroxyethyl aconitate.

Examples of strong acid salts of polymerizable amino containing monomers are the hydrochloric, hydrobromic, sulfuric acid, nitric acid, phosphoric acid, benzene sulfonic acid, naphthalene sulfonic acid, trichloroacetic acid, and p-toluene sulfonic acid salts of diethylaminoethyl methacrylate, dimethyl aminoethyl methacrylate, monoethylaminoethyl methacrylate, t-butylaminoethyl methacrylate, p-aminostyrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-2-hydroxypropyl acrylate, 3-(dimethylaminoethyl)-2-hydroxypropyl methacrylate, 2-aminoethyl acrylate, 2-aminoethyl methacrylate.

As water soluble polymers, there can be employed for example, water soluble polysaccharides, e.g., starch or dextrin, e.g., with a dextrose equivalence (D.E.) of 42, polyvinyl alcohol, hydrolyzed cellulose acetate with the degree of hydrolysis sufficient to impart water solubility, partially hydrolyzed polyvinyl acetate (the degree of hydrolysis being sufficient to impart water solubility), polyvinylpyrrolidone, methyl cellulose, hydroxyethyl cellulose, hydroxypropyl cellulose, sodium carboxymethyl cellulose and other water soluble cellulose ethers and esters.

As used herein, the term lower alkyl means 1 to 4 carbon atom alkyl.

As the substrate there can be used, for example, wood chips, wood shavings, wood flour, sawdust, straw, clay, (e.g., for cat litter), porous beads, e.g., polyethylene, polypropylene or polystyrene porous beads, paper (which can be shredded if desired), cloth, alfalfa, cotton, sand, bark, ground corn husks, ground sugar cane pellets made from alfalfa, sugar cane or corn husks for example. Thus waste lignocellulose, cellulose and other byproducts can be used with advantage.

The products are useful particularly as litter for cats and dogs, but can also be used as litter for other domestic animals and pets, e.g., gerbils, guinea pigs, mice, rats, rabbits, etc. Usually the range of polymer to substrate is between 1 to 110 weight percent (based on the weight of substrate), the preferred range is between 5 and 30 weight percent of polymer per 100 parts by weight of substrate.

An important component of the product of the invention is a fragrance or deodorizer which is incorporated in the solid, water-soluble copolymer. The fragrances and deodorizers include, for example, fragrances such as rose, apple, lemon, orchid, pine oil, orange oil, peppermint oil, violet, or cedar wood and deodorizers such as $ClO_2$, Grillocin and Nodor.

The polymeric products of the present invention having the fragrance or deodorizer entrapped or encapsulated therein, provide animal litters having prolonged fragrance or deodorizer release in comparison to animal litters using as the polymer water soluble polymers which are not copolymerized with the hydroxy ester of the 2-alkenoate. The animal litters of the invention, not only have much longer effectiveness in release of fragrance of deodorizer for masking the odor of excretions of animals, but they also have much better shelf life than fragrance or deodorizers containing water soluble polymers not containing the hydroxyester of a 2-alkanoate.

The water soluble polymers employed are non-polluting and are normally less expensive than polymers containing more of the hydroxyester of the 2-alkenoate.

As the hydroxy ester of the 2-alkenoate there can be used for example, 2-hydroxyethyl acrylate, 2-hydroxyethyl methacrylate, hydroxypropyl acrylate, hydroxypropyl methacrylate, hydroxytrimethylene acrylate, hydroxytrimethylene methacrylate, 2-hydroxybutyl acrylate, 4-hydroxybutyl acrylate, 2-hydroxybutyl methacrylate, 4-hydroxybutyl methacrylate, 2-hydroxyethyl ethacrylate, 2-hydroxyethyl propacrylate, 2-hydroxyethyl butacrylate, diethylene glycol monoacrylate, dipropylene glycol monoacrylate, diethylene glycol monomethacrylate, dipropylene glycol monomethacrylate, triethylene glycol monoacrylate, triethylene glycol monomethacrylate, tetraethylene glycol monoacrylate, tetraethylene glycol monomethacrylate, pentaethylene glycol monoacrylate and pentaethylene glycol monomethacrylate.

In a preferred embodiment, the novel copolymers are characterized by about 5 to 35 weight percent of the following recurring unit:

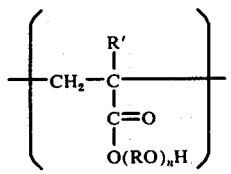

where R, R' and n are as defined above. The most preferred copolymer is a copolymer of hydroxyethyl methacrylate and acrylamide. The fragrance or deodorizer can be incorporated, e.g., encapsulated or entrapped, in the polymer in widely varying amounts, e.g., from 0.05 to 150 parts, usually 30 to 120 parts and preferably 80 to 100 parts, per 100 parts of polymer by weight. The fragrance or deodorizer is present in an amount sufficient to mask or deodorize the animal excrement.

The fragrance or deodorizer can be incorporated into the monomer before polymerization or can be incorporated in the polymer after polymerization. Polymerization can take place in conventional manner, e.g., by bulk copolymerization of the hydroxy ester of the 2-alkenoate and the other water soluble monomer of water soluble polymer or there can be used solution polymerization using water or a lower alkanol, e.g., methyl alcohol, ethyl alcohol or isopropyl alcohol. Usually the solution contains 10–40% solids, preferably 20–30% but this can be varied.

There also can be employed conventional polymerization accelerators such as ultraviolet light, radiation and free radical catalysts, e.g., organic peroxides such as benzoyl peroxide, persulfates, e.g., potassium persulfate and ammonium persulfate, isopropyl percarbonate, cumene hydroperoxide, t-butyl peroctoate, azo compounds such as azobisisobutyronitrile, etc. Polymerization can be carried out at room temperature or at elevated temperatures, e.g., from 50° C to the boiling point of the solvent. The pressure can be atmospheric or elevated pressure can be used. Preferably, polymerization is carried out under a blanket of an inert gas, e.g., nitrogen or argon.

If desired dispersion of the fragrance or deodorizer in the polymer solution can be hastened by employing a detergent, e.g., an anionic emulsifier such as soap, Miranol, sodium lauryl sulfate or the like or a nonionic emulsifier such as p-isooctyl-phenol condensed with 10 moles of ethylene oxide.

Unless otherwise indicated all parts and percentages are by weight.

EXAMPLE 1

The following copolymers were prepared by solution polymerization under inert atmosphere in a glass kettle, equipped with a stirrer and a reflux condenser. Potassium persulfate was used as a free radical initiator in an amount of 0.2 parts per 100 parts of monomers. The temperature of the polymerization was 68° C and the time of polymerization was 3 hours. The initial solids level for all of the reactions was 9.88 parts of the monomers per 100 parts of the total reaction mixture. The solvent was made of 99 parts water and 1 part of isopropyl alcohol.

| Formula | Composition of Monomeric Mixture | Conversion | Viscosity (cps) at 25° C. (Brookfield Viscosimeter) |
|---|---|---|---|
| (a) | 2-hydroxyethyl methacrylate acrylamide | 15 parts 100% 85 parts | 4,220 |
| (b) | 2-hydroxyethyl methacrylate acrylamide | 30 parts 100% 70 parts | 1,680 |
| (c) | 2-hydroxyethyl methacrylate N-vinyl pyrrolidone | 20 parts 100% 80 parts | Over 1 mil. |

EXAMPLE 2

In a glass kettle, equipped with a stirrer and a reflux condenser the following copolymers were prepared by solution polymerization in water at 20 parts per hundred solids (except in example (c)), using potassium persulfate as a free radical initiator. The reaction time was 5 hours. The polymerizations were run under an inert atmosphere in the presence of a chain terminator. The term 2-HEMA is an abbreviation for 2-hydroxyethyl methacrylate. The viscosities were measured with a Brookfield Viscosimeter at 25° C. In formula (c) rather than 100% water the solvent was a mixture of 99 parts water and 1 part isopropyl alcohol and the solids level was 9.98 parts per 100 parts of total reaction mixture.

| Formula | Monomer Parts Mixture | | Chain Terminator parts/100 parts monomer | Temp. ° C | Catalyst Level | Conversion % | Viscosity (cps) |
|---|---|---|---|---|---|---|---|
| (a) | 2-HEMA Acrylamide | 15 85 | Thioglycerol 0.75 | 74 | 0.38 | 100 | 60.6 |
| (b) | 2-HEMA Acrylamide | 15 85 | Thioglycerol 0.50 | 74 | 0.38 | 100 | 182.0 |
| (c) | 2-HEMA Acrylamide | 15 85 | Thioglycerol 0.35 | 74 | 0.38 | 100 | 505.0 |
| (d) | 2-HEMA Acrylamide | 15 85 | Thioglycerol 0.25 | 74 | 0.38 | 100 | 4220.0 |
| (e) | 2-HEMA Acrylamide | 15 85 | None | 68 | 0.19 | 100 | 3000.0 |

| Formula | Monomer Parts Mixture | | Chain Termina- tor parts/100 parts monomer | Temp. °C | Catalyst Level | Conversion % | Viscosity (cps) |
|---|---|---|---|---|---|---|---|
| (f) | 2-HEMA | 15 | Thioglycolic Acid 0.35 | 60 | 0.72 | 100 | 3000.0 |
| | Acrylamide | 85 | | | | | |
| (g) | 2-HEMA | 10 | Thioglycerol 0.35 | 74 | 0.50 | 50 | 4.5 |
| | 2-vinylpyrrolidone | 90 | | | | | |
| (h) | 2-HEMA | 30 | Thioglycerol 0.35 | 74 | 0.50 | 50 | 8.5 |
| | 2-vinylpyrrolidone | 70 | | | | | |

EXAMPLE 3

The following grafted copolymers were prepared by solution polymerization of 10 solids (i.e., monomer and polymeric polyhydroxy compound) in 89.5 parts of a cosolvent system of ethanol: water, 1:1, with 0.5 part of free radical initiator (tert-butyl peroctoate). The polymerization was conducted at 80° C under a blanket of inert gas (nitrogen) for eight hours in a glass kettle, equipped with a stirrer and a reflux condenser.

| Composition of Solids Polymerized | Parts | Conversion | Viscosity (cps), Brookfield 25° C |
|---|---|---|---|
| (a) 2-hydroxyethyl methacrylate | 20 | 92% | 40 |
| polyvinyl alcohol (Elvanol Dupont) | 80 | | |
| (b) 2-hydroxyethyl methacrylate | 20 | 98% | 10 |
| hydroxypropyl methyl cellulose (Methocell 50, Dow) | 80 | | |
| (c) 2-hydroxyethyl methacrylate | 20 | 100% | 3400 |
| hydroxypropyl cellulose (Klucel J, Hercules) | 80 | | |

EXAMPLE 4

Solutions were prepared from 5 parts of polymer in 90 parts of a cosolvent mixture of ethanol: water 1:1. To these solutions there were added 5 parts of a lemon fragrance and the fragrance mixed in thoroughly. The following polymers were used:
1. polyacrylamide
2. polyvinyl pyrrolidone
3. polyvinyl alcohol
4. hydroxypropyl cellulose
5. cellulose acetate In the same fashions solutions of the polymers prepared in Example 3 namely, Example 3, formulae (a) through (h) were prepared in the same concentrations in the same solvent mixture and with the identical lemon fragrance and in the same amount.

For the testing purposes various substrates including paper, wood chips and cloth were coated by spraying with both sets of the polymeric solutions in such fashion that the ratio of solution to substrate was 1:4 by weight. The coated substrates were allowed to dry at room temperature and were stored at 20°-22° C and relative humidity 50-60%.

The slow-release properties of the polymeric coatings were evaluated every twelve hours by assessing the fragrance release in the dry state and after the coating was wetted with water. All of the non 2-HEMA containing polymeric coatings (i.e., polymers 1, 2, 3, 4 and 5 of Example 4) exhibited negligible or zero fragrance release in less than 24 hours. therafter, even though the coated substrates were wetted with water or the urine of an animal such as a gerbil, no detectable lemon fragrance was noted by the observer. On the other hand, the polymeric coatings prepared from the polymers of Example 3 (Example 3, formulae (a), (b), (c), (d), (e), (f), (g) and (h)) exhibited dry fragrance release for at least 36 hours and wet fragrance release for at least 96 hours and were effective in masking the odor of urine.

This comparison shows that the incorporation of 2-HEMA into the polymers dramatically improves the slow-release properties in these coatings. This was true even though the polymers were still water soluble.

EXAMPLE 5

Under the same conditions as in Example 4, the 2-hydroxyethyl methacrylate-acrylamide copolymers of Example 2 were evaluated. They exhibited fragrance release in the dry state for up to 96 hours and in the wetted state up to 400 hours.

When the polymers of Example 1 formulae (a), (b) and (c) were applied to the substrates in the same manner the impregnated substrates had a detectable fragrance release (lemon) for 36 hours and more. After the passage of a number of weeks, e.g., two months, in the anhydrous condition, the treated substrates when wetted as indicated above emitted a very noticable lemon fragrance.

In the dry condition, the litters of the invention are quite stable. They are activated to give off the fragrance or deodorizer by contact with aqueous liquid such as urine, for example.

The compositions of the invention can comprise, consist essentially of or consist of the materials set forth.

The term "copolymer" as used herein including the claims is used in its generic sense and includes polymers of at least one hydroxyester of a 2-alkenoate and at least one copolymerizable water-soluble monomer or polymer.

What is claimed is:

1. An animal litter comprising (1) a porous, inert solid substrate treated with (2) a solid water soluble copolymer of (a) 5-35% of a hydroxyester of a 2-alkenoate of the formula

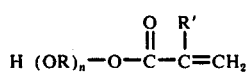

wherein R is alkylene of 2 to 4 carbon atoms, R' is hydrogen or alkyl of 1 to 4 carbon atoms and n is an integer with (b) 95 to 65% of a copolymerizable water soluble monomer or polymer, said copolymer being impregnated with (3) a fragrance or deodorizer.

2. An animal litter according to claim 1 containing 1 to 100 parts of copolymer per 100 parts of substrate and 0.05 to 150 parts of fragrance or deodorizer per 100 parts of copolymer.

3. An animal litter according to claim 1 wherein R is alkylene of 2 to 3 carbon atoms, R' is hydrogen or methyl and n is an integer of 1 to 3.

4. An animal litter according to claim 3 containing 5 to 30 parts of copolymer per 100 parts of substrate and 30 to 120 parts of fragrance or deodorizer per 100 parts of copolymer.

5. An animal litter according to claim 3 wherein (a) is hydroxyethyl methacrylate.

6. An animal litter according to claim 1 wherein (b) is an ethylenically unsaturated monomer, a water soluble polysaccharide, a water soluble cellulose ether or ester, a water soluble partially hydrolyzed polyvinyl acetate, polyvinyl pyrrolidone or polyvinyl alcohol.

7. An animal litter according to claim 1 wherein when (b) is an ethylenically unsaturated monomer the monomer is an ethylenically unsaturated amide, an alkenyl pyrrolidone or an alkenyl pyridine.

8. An animal litter according to claim 7 wherein the water soluble polysaccharide is a starch or dextrin.

9. An animal litter according to claim 1 wherein (b) is an ethylenically unsaturated amide, an alkenyl pyrrolidone, an alkenyl pyridine or vinyl sulfonic acid.

10. An animal litter according to claim 9 wherein (b) is acrylamide, methacrylamide, an N-lower alkyl alkenamide, an N,N-dilower alkyl alkenamide or an alkenyl pyrrolidone.

11. An animal litter according to claim 10 wherein (b) is acrylamide or N-vinyl pyrrolidone.

12. An animal litter according to claim 11 wherein (a) is hydroxyethyl methacrylate and (b) is acrylamide.

13. An animal litter according to claim 12 wherein the copolymer is a copolymer of 10 to 30% of (a) with 90 to 70% of (b), the substrate contains 5 to 30 parts of the copolymer per 100 parts of substrate.

14. An animal litter according to claim 13 wherein the amount of fragrance or deodorizer is 30 to 120 parts per 100 parts of copolymer.

15. An animal litter according to claim 1 wherein the substrate contains cellulose, clay or porous bead.

16. An animal litter according to claim 15 wherein the substrate is clay.

17. An animal litter according to claim 15 wherein the substrate contains lignocellulose.

18. An animal litter according to claim 1 wherein the substrate is paper or cloth.

19. An animal litter according to claim 18 wherein the substrate is paper.

20. An animal litter according to claim 1 having animal excrement thereon, the amount of fragrance or deodorizer being sufficient to mask or deodorize the odor of the excrement.

* * * * *